No. 700,647. Patented May 20, 1902.
J. HARTNESS.
POWER TRANSMISSION MECHANISM.
(Application filed Feb. 19, 1901.)
(No Model.) 2 Sheets—Sheet 1.
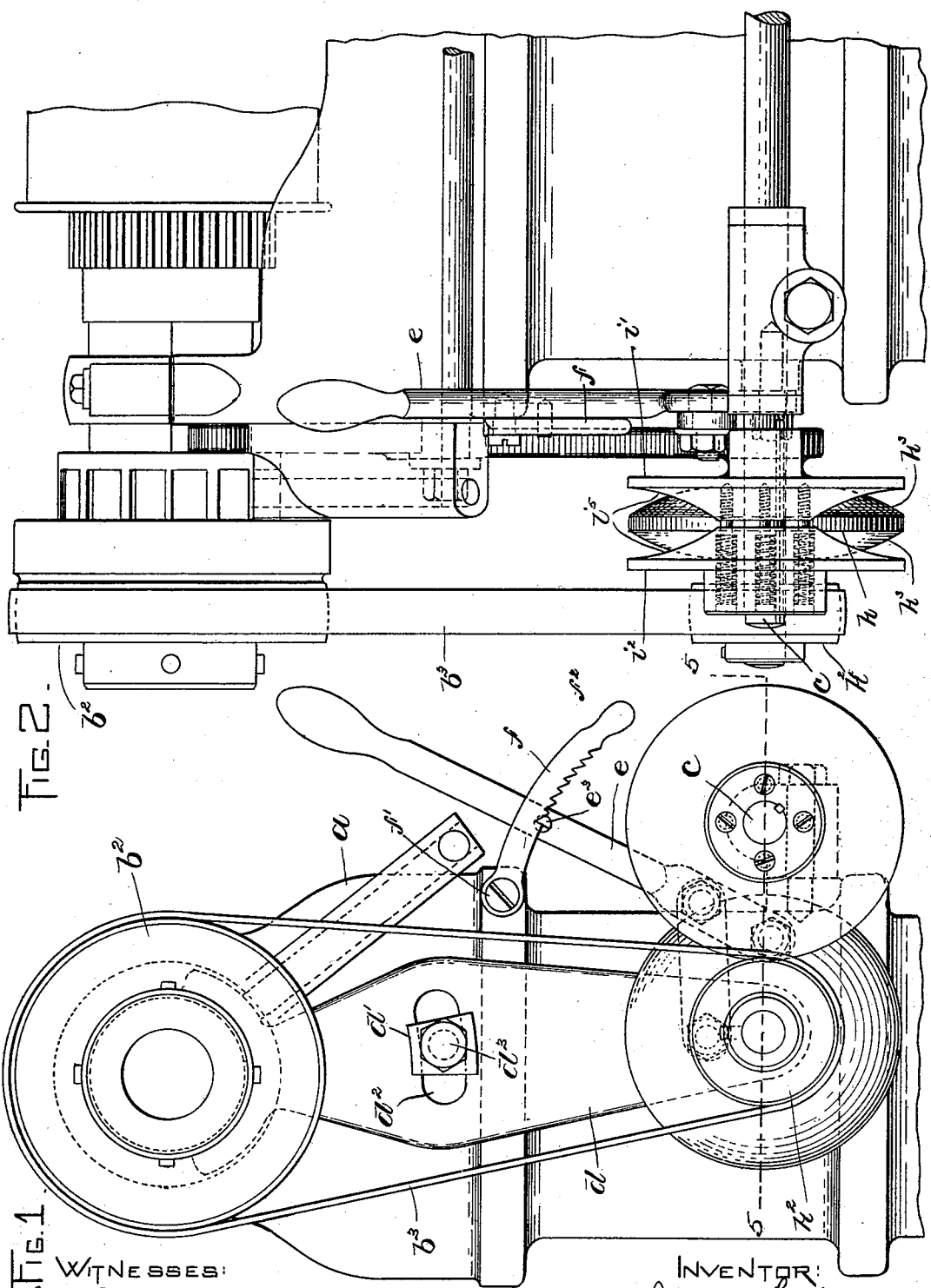
WITNESSES:
Geo. Pezzetti.
P. W. Pezzetti.
INVENTOR:
James Hartness
by Albright Brown & Dunlap
his attys No. 700,647. Patented May 20, 1902.
J. HARTNESS.
POWER TRANSMISSION MECHANISM.
(Application filed Feb. 19, 1901.)
(No Model.) 2 Sheets—Sheet 2.
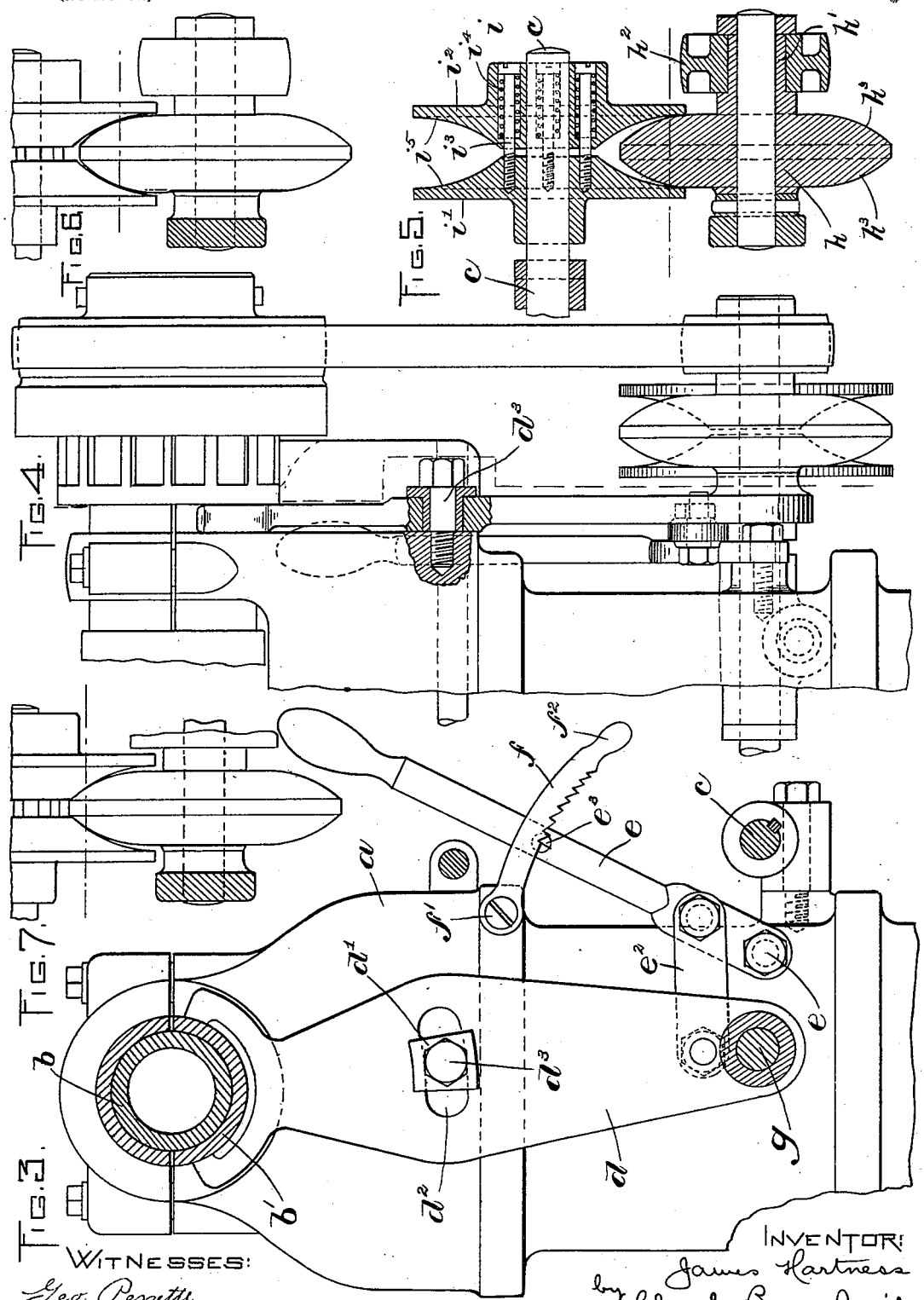

UNITED STATES PATENT OFFICE.

JAMES HARTNESS, OF SPRINGFIELD, VERMONT.

POWER-TRANSMISSION MECHANISM.

SPECIFICATION forming part of Letters Patent No. 700,647, dated May 20, 1902.

Application filed February 19, 1901. Serial No. 47,907. (No model.)

*To all whom it may concern:*

Be it known that I, JAMES HARTNESS, of Springfield, in the county of Windsor and State of Vermont, have invented certain new and useful Improvements in Power-Transmitting Mechanism, of which the following is a specification.

This invention has relation to power-transmitting mechanism, and more particularly to that class of mechanism wherein power is imparted from a driving to a driven member by intervening frictionally-engaging parts.

The object of the invention is to provide friction devices by means of which the speed of the driven member may be graduated from fast to relatively slow, or vice versa, with the least liability of one friction member to slip upon the other, whereby the movement of the driven member may be steady and even.

For the purpose of illustrating the practical application of the invention I have shown it as employed in connection with a lathe of the type illustrated in Letters Patent No. 457,967, granted to me August 18, 1891.

On the accompanying drawings, Figure 1 represents an end elevation of a lathe equipped with the invention. Fig. 2 represents a front elevation of the end of the lathe. Fig. 3 represents a transverse section through the end of a lathe. Fig. 4 represents a rear elevation with parts broken away to show the quadrant-supporting stud. Figs. 5, 6, and 7 represent the different relative positions of the driving and driven friction members, Fig. 5 being a section through said members on the line 5 5 of Fig. 1.

Referring to the said drawings, $a$ indicates the end of the lathe, in the upper portion of which is journaled the spindle $b$, to which power is imparted in the usual manner. In front of the lathe there is a feed-shaft $c$, and my invention is utilized for transmitting power from the spindle to the feed-shaft to rotate the latter at any one of several different speeds.

The invention, as illustrated, comprises a swinging support or quadrant $d$, which is adapted to oscillate about the axis of the lathe-spindle, having a segmental head, which rests against the box $b'$, being held in that position by a headed block $d'$, passing through a segmental slot $d^2$ in said support and held in position by a stud $d^3$, screwed into the end of the lathe. The support is adapted to swing backward and forward by a hand-lever $e$, fulcrumed upon the stud $e'$ and connected to the lower end of said support by a connecting-rod $e^2$, as best shown in Fig. 3. When the handle is depressed, it draws the lower end of the support forward and when raised forces it rearward, as will be readily understood.

The lever $e$ is formed with a pawl $e^3$, adapted to engage any one of the teeth of the swinging ratchet $f$, having a pivoted support at $f'$. The end of the ratchet is formed with a handle $f^2$, by means of which it may be raised to permit the hand-lever $e$ to be swung rearward. On the lower end of the support is mounted a stud-shaft $g$, upon which is journaled a friction driving member $h$, said member being formed with a hub $h'$, upon which is rigidly mounted a belt-pulley $h^2$. On the spindle $b$ there is a pulley $b^2$, from which rotary motion is imparted to the pulley $h^2$ by an endless belt $b^3$.

On the feed-shaft $c$ there is a friction member $i$, which coacts with that at $h$ in imparting power from the belt-pulley $h^2$ to the feed-shaft $c$.

The essence of the invention consists in the formation of the contacting surfaces of the axially-parallel driving and driven members, by means of which the driven member may be rotated at any one of several different speeds, one of said members being provided with a convex friction-surface and the other being formed with a concave friction-surface, the curvature of the convex member being greater than that of the concave member. One of the said members is necessarily movable in the direction of its axis and is preferably spring-pressed to effect a proper engagement of the two surfaces irrespective of the different relative positions of said members.

I have shown the driving member as being convex and having the curved faces $h^3$ $h^3$. The driven member, as illustrated, consists of two disks $i'$ $i^2$, which are splined to the feed-shaft $c$. The two disks are connected together by the headed screws $i^3$, spiral springs $i^4$ being employed for drawing said disks yieldingly together. The engaging surfaces of said disks are concave, as indicated at $i^5$, the curvature of said faces being less than the curvature of the convex surface of the driving member $h$, as clearly shown in Figs. 5, 6, and 7. The opposing faces $i^5$ provide a groove, into which the driving member $h$ is adapted to extend, as shown in Fig. 5. The convex surface is the arc of a circle having a relatively short radius, while the concave surface is the arc of a circle having a relatively long radius. This construction provides for the point of contact between the driving and the driven members being shifted gradually from a point radially near the axis of the driving member to a point relatively distant thereto or relatively near the axis of the driven member.

In Fig. 5 the concave disks are shown as contacting with the driving member practically at their outer edges, whereby said driven member is rotated at a relatively slow speed. In Fig. 6 the points of contact between the driving and the driven members are relatively nearer the axis of the driven member, and, further, are relatively distant from the axis of the driving member, whereby the driven member is rotated at a faster speed. Again, in Fig. 7 the points of contact between the driving and the driven members are practically at the periphery of the driving member, and consequently the driven member is rotated at the highest possible speed.

So far as I am aware I am the first to have provided power-transmitting friction mechanism comprising two members whose contacting surfaces are respectively convex and concave, with the curvature of concavity less than the curvature of convexity. It is not at all essential that the driving member should be convex, as the positions of the members might be reversed, so as to impart power from the feed-shaft to the lathe-spindle, if it were desirable so to do. Nor is it at all necessary that the driven member should be made in two parts, drawn yieldingly together by springs, for the driving member may be constructed in two parts with springs between them, all without departing from the spirit and scope of the present invention.

Each of the members in its simplest form is in the shape of a truncated geometric figure formed by moving a curved line about a fixed point, and I adopt the terms "concave cone" and "convex cone" to describe and claim them. The driving member may be said to be a "double convex cone"—that is, two cones having a common base—and the driven member may be described as a "double concave cone"—that is, two cones having their bases parallel and their apexes projecting toward each other.

Having thus explained the nature of the invention and described a way of constructing and using the same, although without attempting to set forth all of the forms in which it may be made or all of the modes of its use, I declare that what I claim is—

1. The combination with a driving-shaft and a driven shaft, of an interposed friction mechanism comprising two friction members, one of which is bodily movable in lines radial to the axis of the other member, said members having parallel axes and having concave and convex faces respectively, whereby the point of contact between said faces may be advanced toward the periphery of one member and simultaneously toward the axis of the other member, means for giving said movable member its described movement, and a device for holding said means at any desired position.

2. The combination with a driving-shaft and a driven shaft arranged in parallelism, of a support movable about the axis of the driving-shaft, a friction member on said support, power-transmitting mechanism between said friction member and said driving-shaft, a friction member on the driven shaft, means for moving said support toward and from the driven shaft, and a ratchet for holding said means in any desired position.

3. The combination with a driving-shaft, of a support oscillatory about the axis of the said shaft, a hand-lever connected to said support to oscillate it, a manually-operated ratchet for holding said hand-lever in any desired position, a driven shaft parallel to the driving-shaft, a friction member on said driven shaft, and a friction member on said support actuated by the driving-shaft, and adapted to be brought into operative relation to said driven friction member to actuate the same at any of a variety of different speeds.

In testimony whereof I have affixed my signature in presence of two witnesses.

JAMES HARTNESS.

Witnesses:
D. S. BROWNELL,
A. N. HOWE.